July 18, 1939.    B. C. MILLER    2,166,819
METHOD OF PRODUCING MULTILAYER RIBBON STRIPS
Filed Jan. 4, 1936
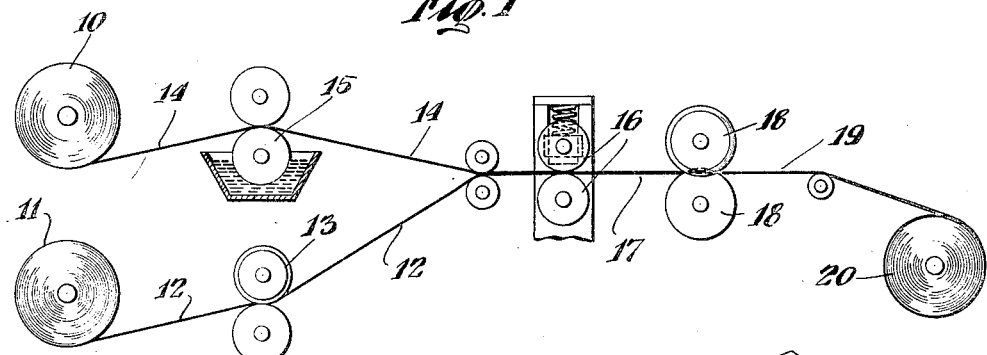
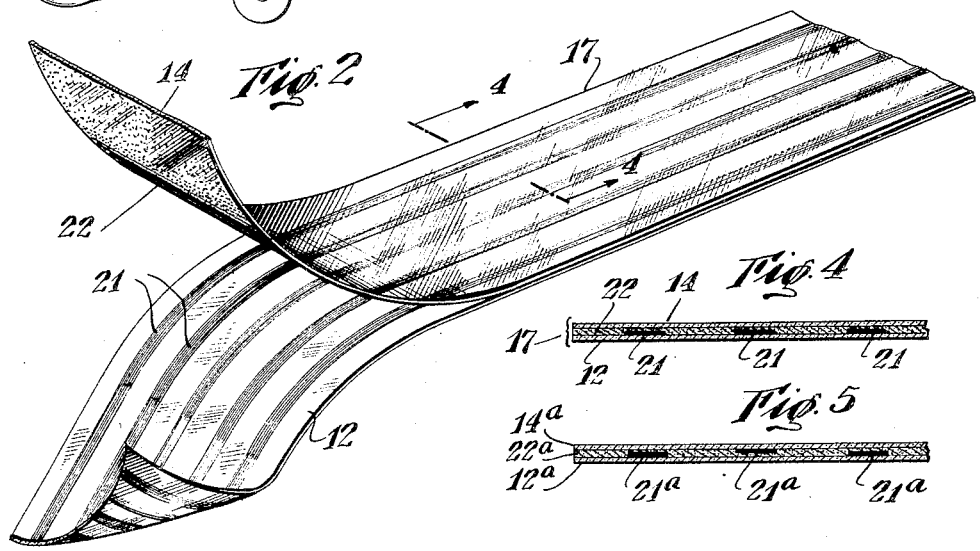
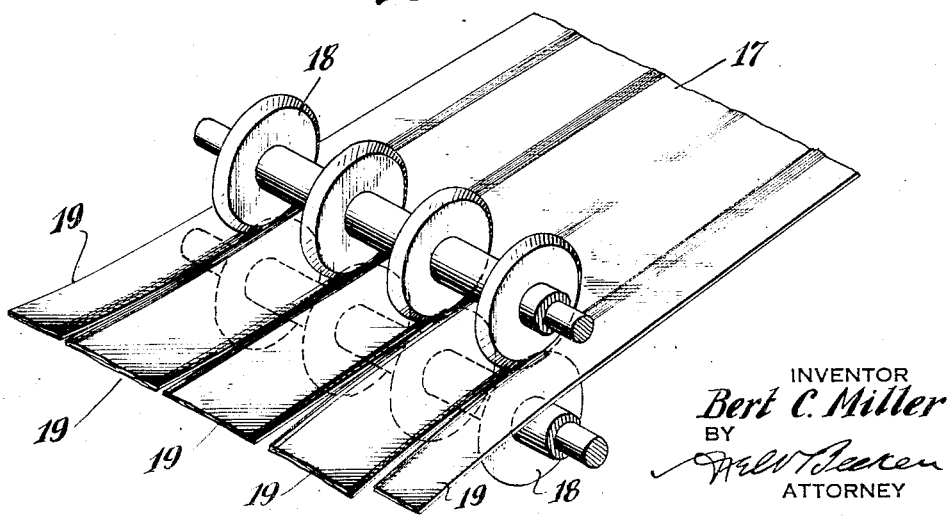
INVENTOR
Bert C. Miller
BY
ATTORNEY Patented July 18, 1939

2,166,819

UNITED STATES PATENT OFFICE 2,166,819

METHOD OF PRODUCING MULTILAYER RIBBON STRIPS

Bert C. Miller, Montclair, N. J.

Application January 4, 1936, Serial No. 57,477

2 Claims. (Cl. 154—40)

This invention relates to flexible material and has as its main object and feature the production of a multi-layer web section of uniform thickness which simulates a single thickness of material that apparently has, on both faces, decoration as well as uniform lustre, and to the method of obtaining such product.

In the accompanying drawing, the invention is disclosed in several concrete and preferred forms, in which Fig. 1 is a diagrammatic view in side elevation showing a preferred form of mechanism by which a preferred form of the method can be carried out, and a preferred form of the desired product can be obtained;

Fig. 2 is a perspective view of a web portion of multi-layer material with the layers partly separated;

Fig. 3 is a perspective view of the web portion of Fig. 2 showing the slitting operation;

Fig. 4 is a fragmentary sectional view substantially on the plane of line 4—4 of Fig. 2; and Fig. 5 is a view similar to Fig. 4 showing a modified form of the invention.

The material used can be transparent regenerated cellulose, cellulose acetate, gelatin or any transparent and highly lustrous material such as non-fibrous cellulose material that lends itself to decorative purposes. Material of this character is now being used extensively for wrapping and as a substitute for twine or tape and it has become the custom to decorate, as by printing, the material so used. Both sides of the material are highly lustrous, but on being decorated, as by printing, said material becomes dull in the decorated areas and presents an unpleasing appearance, especially when only one side is decorated because a highly and uniformly lustrous surface is then contrasted with the other surface which has lost some of its brilliance by being decorated. The invention overcomes this objection by uniformly uniting two layers of lustrous and transparent material by means of a film of translucent and flexible adhesive, the inner surface of at least one of the layers being decorated with non-fibrous non-lustrous decoration such as ink. In this way, the product, which is of uniform thickness, simulates a single thickness of material that apparently has, on both faces, decoration as well as uniform lustre, because the decoration is substantially equally visible from both sides owing to the transparence of the layers and the translucence of the adhesive, and because the adhesive uniformly unites the layers of material and renders the inner faces thereof substantially devoid of reflecting qualities.

In Fig. 1 is shown a mechanism for carrying out the process and obtaining the product. 10 and 11 indicate two rolls of transparent and lustrous material such as non-fibrous cellulose material. One web, 12, is led through a printing machine, the printing cylinder 13 of which decorates one face of the web. The other web, 14, is led to an adhesive applying device, the adhesive-applying roller 15 of which applies a film of adhesive to one of the faces of said web. The two webs are then led to a pair of combining or pressure rollers 16, and are there united into a web section 17 of uniform thickness with the printed face of web 12 innermost or adjacent the adhesive face of web 14. Web section 17 may then pass through slitters 18 and the narrower web sections or strips 19 can then be rewound into coils 20. The decoration is indicated at 21 and may be of any character but is here shown as conventional stripes, and the flexible and translucent adhesive is shown at 22.

Of course, if desired, more than two layers of material can be employed and if desired both of the inside faces can be decorated and have adhesive applied to them. Thus in Fig. 5, decoration 21a is applied to both layers 12a and 14a and a film of flexible and translucent adhesive 22a is interposed by applying it to either one or both layers.

The adhesive used may be of any character, suitable for the purpose, such as what is commercially known as adhesive 990 of the Union Paste Co. I am informed that the ingredients of this adhesive are as follows:

| | Parts by weight |
|---|---|
| Sugar | 15 |
| Casein | 4 |
| Concentrated latex of the 60–70% concentration | 60 |
| Water | 22 |
| Preservative | .8 |
| Sodium hydroxide 49° Baumé | .6 |

I claim:

1. The method of producing multi-layer ribbon strips of uniform thickness—but which simulate a single thickness of material that has, on both faces, uniform lustre as well as decoration— which consists in decorating with lines of a non-fibrous, non-lustrous substance, one face of a layer of lustrous, translucent material and uniting said layer, with its decorated face innermost, to another layer of the same material as the first one with a film of flexible and translucent adhesive between the two layers; and then slitting the united layers, along the lines of decoration so as to leave decoration on the edges of adjacent strips.

2. The method of producing multi-layer ribbon strips of uniform thickness—but which simulate a single thickness of material that has, on both faces, uniform lustre as well as decoration—which consists in decorating, with lines of a non-fibrous, non-lustrous substance, one face of a layer of lustrous, translucent material and uniting said layer, with its decorated face innermost, to another layer of the same material as the first one with a film of flexible and translucent adhesive between the two layers; and then slitting the united layers in definite relation to the printed lines.

BERT C. MILLER.